(12) United States Patent
Grosch

(10) Patent No.: US 6,892,621 B2
(45) Date of Patent: May 17, 2005

(54) MINE PROTECTION DEVICE, PARTICULARLY FOR WHEELED VEHICLES

(75) Inventor: Hermann Grosch, Nienhagen (DE)

(73) Assignee: Rheinmetall Landsysteme GmbH, Kiel (DE)

( * ) Notice: Subject to any disclaimer, the term of this patent is extended or adjusted under 35 U.S.C. 154(b) by 0 days.

(21) Appl. No.: 10/739,947

(22) Filed: Dec. 19, 2003

(65) Prior Publication Data

US 2004/0200347 A1 Oct. 14, 2004

(30) Foreign Application Priority Data

Dec. 20, 2002 (DE) .......................................... 102 59 918

(51) Int. Cl.$^7$ ................................................. B64D 1/04
(52) U.S. Cl. ............................ 89/1.11; 89/1.1; 89/1.13; 180/271; 180/282; 180/289
(58) Field of Search ................. 89/1.13, 1.11, 89/1.1; 180/271, 274, 282, 289

(56) References Cited

U.S. PATENT DOCUMENTS

| | | | | |
|---|---|---|---|---|
| 4,548,290 A | | 10/1985 | Smith | |
| 5,712,441 A | * | 1/1998 | Grunewald | 89/1.13 |
| 5,786,542 A | * | 7/1998 | Petrovich et al. | 89/1.13 |
| 6,026,135 A | * | 2/2000 | McFee et al. | 376/159 |
| 6,044,921 A | * | 4/2000 | Lansberry | 180/9.36 |
| 6,343,534 B1 | * | 2/2002 | Khanna et al. | 89/1.13 |
| 6,420,803 B1 | | 7/2002 | Woodall et al. | |

FOREIGN PATENT DOCUMENTS

| | | |
|---|---|---|
| DE | 3220007 A1 | 12/1983 |
| DE | 4330216 A1 | 3/1995 |
| DE | 19631715 A1 | 2/1998 |
| DE | 19738239 C1 | 2/1999 |
| DE | 19734950 C2 | 5/1999 |
| DE | 19935573 A1 | 2/2001 |
| GB | 8700717.7 | 10/1987 |
| WO | WO 02/47958 A2 | 6/2002 |

OTHER PUBLICATIONS

European Search Report, completed Apr. 14, 2004.
Database WPI, Section PQ, Week 200301, Derwent Publications Ltd., London, GB; AN 2003–012140 XP–002275628 & KR 2002 050 608 A (Hyundai Motor Co Ltd) Jun. 27, 2002.
Communication for the German Patent Office dated Mar. 19, 2004.

* cited by examiner

Primary Examiner—J. Woodrow Eldred
(74) Attorney, Agent, or Firm—Griffin & Szipl, P.C.

(57) ABSTRACT

A mine protection device for a wheeled vehicle having a plurality of wheels, wherein each wheel is connected to the vehicle by a wheel suspension, and the device includes: at least one sensor associated with each wheel, wherein each sensor operates to detect when the associated wheel has driven over a mine or when a proximate mine is ignited; at least one ignition and analysis unit connected to receive sensor signals from each sensor, wherein the at least one ignition and analysis unit processes individual sensor signals; and a separation means associated with each wheel, wherein the separation means operates to separate the associated wheel from the vehicle, when the associated wheel has driven over a mine or when a proximate mine has been ignited, by separating the wheel suspension connected to the associated wheel from the vehicle.

18 Claims, 4 Drawing Sheets

MINE PROTECTION DEVICE, PARTICULARLY FOR WHEELED VEHICLES

The present invention claims priority on German Patent Application No. 10259918.1, filed Dec. 20, 2002, the entire disclosure of which is incorporated herein by reference.

FIELD OF THE INVENTION

The present invention relates to a mine protection device for a vehicle, particularly, for a wheeled vehicle and like, such as might be used by the military. More particularly, the present invention is directed to a mine protection device applicable to a vehicle, wherein the mine detection device includes at least one sensor for detecting a mine, and a separation means for a wheel of the vehicle. When a wheel runs over a mine, the corresponding separation means is activated so as to separate this one wheel from the vehicle. In this way, for example, the vehicle and its occupants are spared from transmission of the full force of the mine blast through the one wheel.

BACKGROUND OF THE INVENTION

Presently available technology exists for protecting troops from injury by land mines and other explosive devices placed on the ground. Certain mine protective devices utilize a dampening device to decouple troops in the interior, or inner structure, of the vehicle from transmission of the shock waves produced by an exploding mine or other exploding device. For example, German Document DE 19935573 A1 (hereafter, the German'573 Document) teaches a protective assembly for protecting occupants of a vehicle from the effects of exploding mines wherein the seats are provided with damping elements. In this case, each seat is connected to the vehicle structure by means of the damping elements so that a portion of the shock wave generated by an exploding mine is absorbed by the dampening elements. In this way, the magnitude of the portion of the shock wave that is still conducted through the seat is significantly reduced, and the amount of harm inflicted on the vehicle occupants is likewise reduced.

The protective assembly taught by DE 19935573 A1 (DE '573) is designed as a kit that can be potentially disposed underneath the vehicle, and that can be mounted on the vehicle as necessary. The protective assembly taught by the DE '573 is composed of profile supports comprising drive or running mechanism components, and a protection device connected to the profile supports and that is separate from the vehicle. In the region between the profile supports, the protection device is free of support and is disposed at a distance from the floor of the vehicle.

Other mine protection measures include supplemental armor. A mine protection assembly utilizing this kind of protection is described in DE 19734950 C2 (hereafter, DE '950). This mine protection assembly utilizes a particular layer construction, which comprises a first resin foam layer, a one-or-more-layered structural element plate, a resin foam layer, and a pressure resistant, bend-resistant, stiff plate.

An additional degree of mine blast protection can be achieved by constructing the floor of a vehicle in such a way that the energy of deformation produced by mine explosion can be absorbed without tearing the vehicle floor. Even the geometry of the vehicle undercarriage is often optimized for achieving shock wave protection from mine detonation. It is an object of the present invention to provide a device for providing mine blast protection that can be used separately, or in combination, with the mine protection assemblies known in the prior art.

It is an object of the present invention to prevent the transmission of a shock wave from an exploding mine into the drive work structure of a vehicle so as to prevent transmission of the shock wave throughout the entirety of the vehicle. Thus, the present invention endeavors to minimize applied damage to the vehicle from the exploding mine and from the mine protection device so that on-site repairs to the vehicle are still possible.

SUMMARY OF THE INVENTION

The object of the invention is solved by the features of a mine protection device in accordance with the present invention that is particularly applicable to wheeled vehicles having a plurality of wheels. The objects of the present invention are achieved by a first embodiment of a mine protection device for a wheeled vehicle having a plurality of wheels, wherein each wheel is connected to the vehicle by a wheel building block, and the device includes: (a) at least one sensor associated with a wheel of the wheeled vehicle, wherein the sensor operates to detect when the wheel has driven over a mine; (b) at least one ignition and analysis unit connected to receive sensor signals from the sensor, wherein the at least one ignition and analysis unit processes individual sensor signals; and (c) a separation means associated with the wheel, for separating the associated wheel from the vehicle, when the associated wheel has driven over a mine, by separating the wheel building block connected to the associated wheel from the vehicle. In another embodiment of the present invention, the firs embodiment can be modified so the wheel building block is a wheel suspension.

In accordance with a second embodiment of the present invention, the first mine protection device embodiment is modified so the separation means comprises a wedge type charge. In accordance with a third embodiment of the present invention, the first mine protection device embodiment is modified so the separation means comprises at least one pyrotechnic separation screw. In accordance with a fourth embodiment of the present invention, any one of the first, second or third mine protection device embodiments are further modified so each sensor is selected from the group consisting of an optical sensor, a pressure sensor and an acceleration sensor.

In accordance with a fifth embodiment of the present invention, a vehicle is provided that includes: (a) a vehicle frame; (b) a plurality of wheels rotatingly connected to the vehicle frame, wherein each wheel is connected to the frame by a wheel suspension; and (c) a mine protection device associated with the vehicle frame, the device comprising (i) a sensor associated with at least one wheel, wherein the sensor is arranged to detect an exploding mine activated by the associated wheel, (ii) an ignition and analysis unit operably connected to receive signal input from the sensor, wherein the ignition and analysis unit processes sensor signal input and generates activation signal output in response thereto, and (iii) a separation means associated with the at least one wheel, wherein the separation means is connected to receive activation signal input from the ignition and analysis unit.

In a sixth embodiment in accordance with the present invention, the fifth vehicle embodiment is modified so that when one wheel of the plurality of wheels drives over and detonates a mine, the sensor associated with the one wheel detects the exploding mine and generates sensor signal input, the ignition and analysis unit receives and processes the sensor signal input then sends an activation signal to the separation means associated with the one wheel, and in response to receiving the activation signal, the separation means separates the one wheel from the vehicle by separating the wheel suspension connected to the one wheel from the vehicle frame. In a seventh embodiment in accordance with the present invention, the sixth vehicle embodiment is further modified so the separation means comprises a wedge type charge. In accordance with an eighth embodiment of the present invention, the sixth vehicle embodiment is further modified so the separation means comprises at least one pyrotechnic separation screw. In accordance with a ninth embodiment of the present invention, any one of the fifth, sixth, seventh or eighth vehicle embodiments are further modified so each sensor is selected from the group consisting of an optical sensor, a pressure sensor and an acceleration sensor.

In accordance with a tenth embodiment of the present invention, a vehicle is provided that includes: (a) a vehicle frame; (b) a plurality of wheels rotatingly connected to the vehicle frame, wherein each wheel is connected to the frame by a wheel suspension; and (c) a mine protection device associated with the vehicle frame, the device comprising (i) a sensor associated with each wheel, wherein each sensor operates to detect an exploding mine activated by the associated wheel, (ii) one ignition and analysis unit associated with, and connected to receive signal input from, each sensor, wherein each ignition and analysis unit operates to process sensor signal input and to generate activation signal output, and (iii) a separation means associated with each wheel, wherein each separation means is connected to receive activation signal input from the ignition and analysis unit associated with the corresponding wheel.

In an eleventh embodiment in accordance with the present invention, the tenth vehicle embodiment is modified so that when one wheel of the plurality of wheels drives over and detonates a mine, the sensor associated with the one wheel detects the exploding mine and generates sensor signal input, the corresponding ignition and analysis unit receives and processes the sensor signal input then sends an activation signal to the separation means associated with the one wheel, and in response to receiving the activation signal, the separation means separates the one wheel from the vehicle by separating the wheel suspension connected to the one wheel from the vehicle frame. In a twelfth embodiment in accordance with the present invention, the eleventh vehicle embodiment is further modified so the separation means comprises a wedge type charge. In accordance with a thirteenth embodiment of the present invention, the eleventh vehicle embodiment is further modified so the separation means comprises at least one pyrotechnic separation screw. In accordance with a fourteenth embodiment of the present invention, any one of the tenth, eleventh, twelfth or thirteenth vehicle embodiments are further modified so each sensor is selected from the group consisting of an optical sensor, a pressure sensor and an acceleration sensor.

The present invention is based on the idea that the triggering of a mine beneath a vehicle, particularly by running over with a wheel or the like, can be directly detected with a sensor. In other words, a sensor can be used to detect an exploding mine. The detonation of the mine is, as a rule, connected with an intensive light flash that can be detected even from a great distance without time lag (i.e., essentially instantaneously) by an optical sensor. Alternatively, pressure and acceleration sensors can also be used. The pressure sensor and the acceleration sensors operate to detect a shock wave/impact sound wave, which is commonly know as a "blast wave." Generally, it is the blast wave, and not the explosive light flash, that causes damage. However, the explosive flash can be detected well before the blast wave hits. Therefore, although it is preferable to use optical sensors to detect a mine explosion, the present invention can utilize pressure sensors and acceleration sensors that detect the blast wave.

The detection signal generated by one of these sensors (i.e., optical sensor, pressure sensor, or acceleration sensor) is sent to an ignition and analysis unit, which is connected to a pyrotechnic separation element. The ignition and analysis unit takes the detection signal and generates an activation signal, which is used to activate the separation element. The separation element operates to separate the wheel, which detonated the mine, from the remainder of the vehicle at a separation point. The separation point is designed so that complete separation of the wheel from the remainder of the vehicle structure occurs. Preferably, the desired separation can be achieved at the separation point by completely freeing of the wheel building block (e.g., the wheel suspension assembly) from the vehicle structure. This separation must occur before the blast wave of the exploding mine is transmitted through the wheel suspension assembly and into the remaining structure of the vehicle. To achieve this desired result, the present invention utilizes a separation element that generates its own shock wave so as to disrupt the separation point and cause separation of the wheel building block or suspension assembly from the vehicle. In this manner, separation of the wheel building block or suspension from the body of the vehicle results when the body impact shock wave (which is a sound wave) reaches the separation point.

One goal of the present invention is to protect the vehicle from transmission of the blast wave of an exploding mine through the wheel suspension assembly and into the rest of the vehicle. This is achieved, as discussed above, by detecting the light flash or the blast wave of the exploding mine, then effecting separation of the wheel suspension assembly from the vehicle. However, the present invention makes use of replaceable parts. Therefore, the separation point is positioned so that it is relatively simple and convenient to mount a replacement module (i.e., a new and undamaged wheel suspension assembly) to the frame of the vehicle. In accordance with the present invention, preferably, separation of the wheel suspension assembly from the vehicle at the separation point is achieved using pyrotechnics. Thus, in accordance with the present invention, a pyrotechnic separation of the support structure of the wheel (i.e. the wheel suspension assembly) is contemplated using a wedge type charge, or by an appropriate construction of the separation point incorporating pyrotechnic separation screws.

In accordance with the present invention, the vehicle can be constructed so these types of pyrotechnic separations can be carried out at other points on the vehicle. In other words, the separation points can be located at other places on the vehicle besides the point of connection between the wheel suspension assembly and the body or frame of the vehicle.

The invention is particularly advantageous by providing vehicles constructed to minimize the destructive effect of the blast wave of an exploding mine. Reducing the destructive effect of a blast wave from a mine exploding under one of the wheels of the vehicle can be achieved by guiding away the suspension of the damaged wheel from the rest of the vehicle without substantial resistance or damage to the surrounding vehicle surfaces, such as the wheel housings.

In accordance with the present invention, the separation of the wheel suspension defines a predetermined breaking point or separation point that allows a defined replacement building block (i.e., replacement wheel suspension assembly or the like replaceable unit) to be introduced, thereby facilitating repair of the vehicle.

Further objects, features and advantages of the present invention will become apparent from the Detailed Description of Preferred Embodiments, which follows, when considered together with the attached drawings.

DETAILED DESCRIPTION OF ILLUSTRATIVE EMBODIMENTS

For the purposes of describing the various illustrative embodiments in accordance with the present invention, reference will be made to the drawings where like references will refer to like parts.

Figure 1:
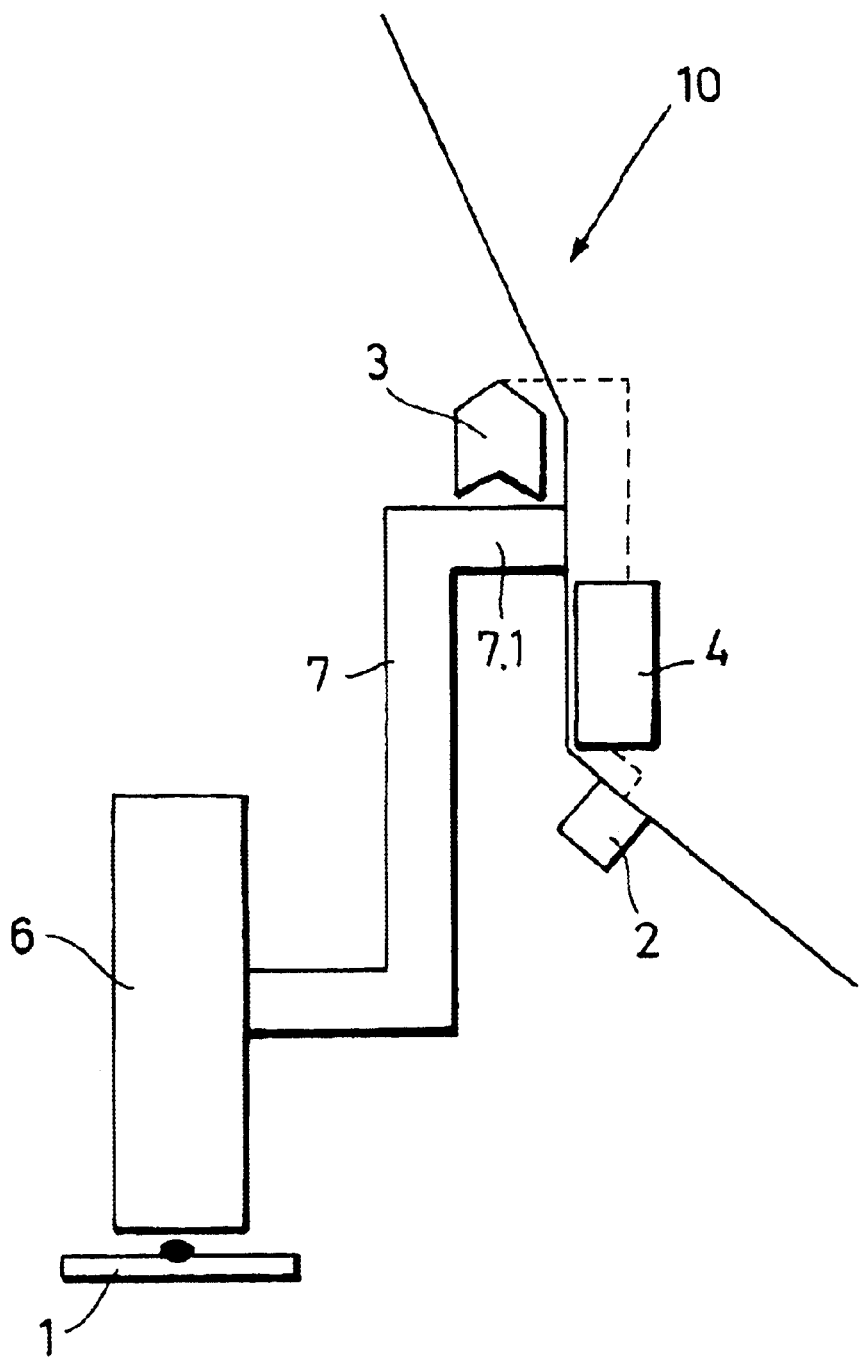
FIG. 1 schematically illustrates a first embodiment of the mine protection device in accordance with the present invention.

In FIG. 1, reference numeral 1 represents a mine, reference numeral 2 represents a sensor, reference numeral 3 represents a wedge-type charge, and reference numeral 4 represents an ignition and analysis unit. Reference numeral 6 represents a wheel. The wheel 6 is rotatingly connected by a wheel suspension 7 to a structure of vehicle 10 (not completely shown), such as a frame or body or other structure of the vehicle. Preferably, the vehicle 10 is a military vehicle, although civilian vehicles could be utilized within the scope of the present invention. A wedge type charge 3 is positioned at a predetermined position on the wheel suspension 7. When the wheel 6 drives over mine 1 so as to detonate the mine, the exploding mine generates a light flash and a blast wave. When sensor 2 detects either the light flash or the blast wave, sensor 2 generates a sensor signal. The sensor 2 is connected to send sensor signals to ignition and analysis unit 4. Therefore, the sensor signal information is passed on to the ignition and analysis unit 4. The ignition and analysis unit 4 then processes the sensor signal and quickly sends out an activation signal to a separation element connected to receive the input signals from the unit 4. In this embodiment of the present invention, the separation element is a wedge type charge 3. The activation signal causes ignition of the wedge type charge 3, which generates a shock wave that separates a portion of the wheel suspension 7 from the vehicle 10 at separation point 7.1 of the wheel suspension 7. In this manner, the wheel 6 is separated from the vehicle 10 even before the impact of the shock wave of the exploding mine impacts, or is transmitted to, the remaining structure (i.e., frame, body, interior compartments for the occupants) of the vehicle 10.

Figure 2:
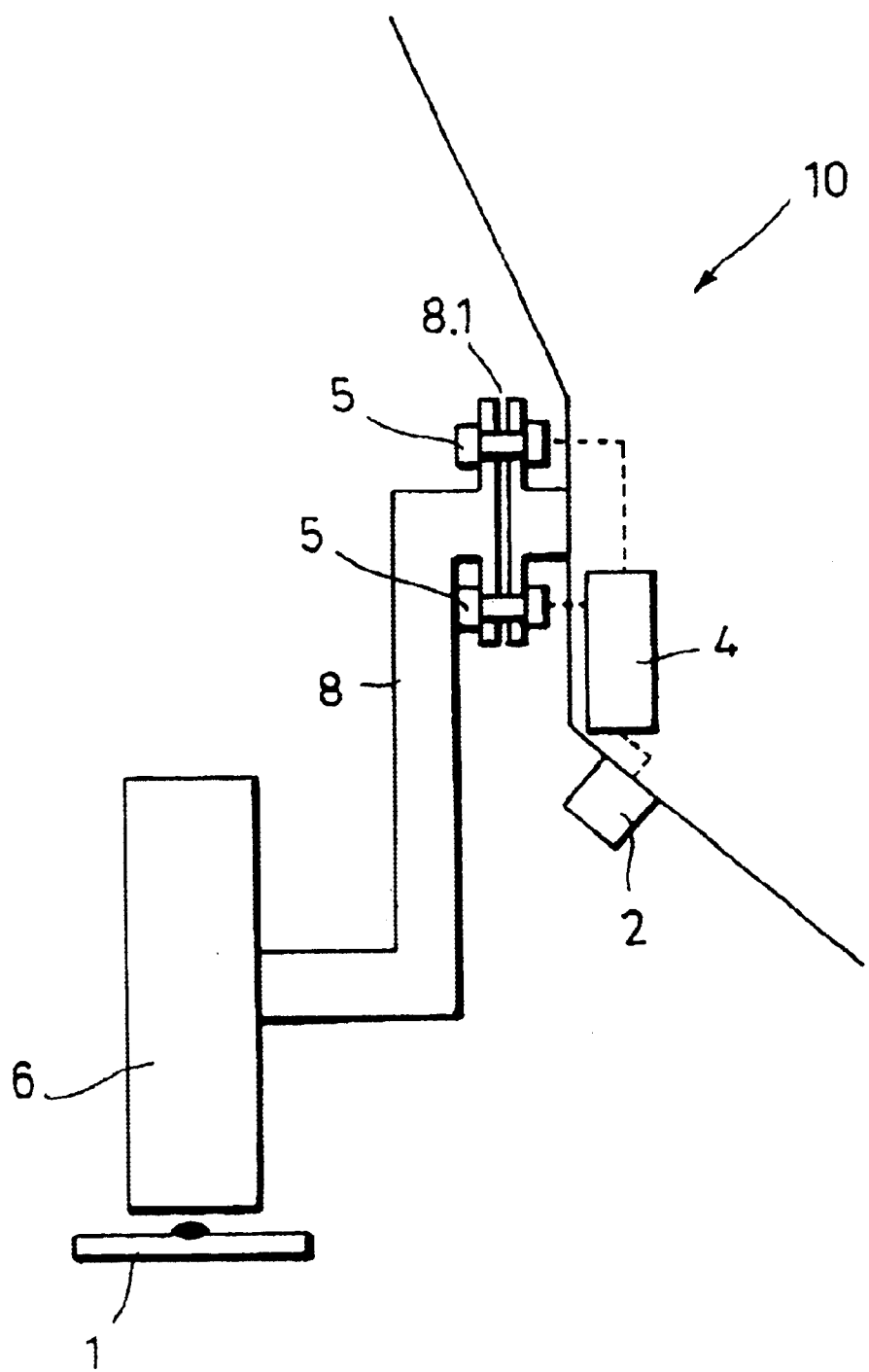
FIG. 2 schematically illustrates a second embodiment of the mine protection device in accordance with the present invention.

FIG. 2 shows another embodiment in accordance with the present invention. In this case, like numerals are used to indicate like parts. In this embodiment, wheel 6 is rotatingly connected to the frame or body of vehicle 10 by wheel suspension 8. A sensor 2 is associated with the remaining structure of vehicle 10 and is connected to send sensor signals to ignition and analysis unit 4, which is also associated with the structure of vehicle 10. In this second embodiment in accordance with the present invention, instead of the wedge type charge 3, the ignition and analysis unit 4 is connected to send activation signals to a separation element provided by two pyrotechnic separation screws 5. These separation screws 5 hold together a particular construction of the wheel suspension 8 at the predetermined breaking point 8.1 to a wheel suspension mount, which is part of the frame or body of vehicle 10. The charge of both separation screws 5 is triggered after detection by sensor 2 of either the light flash or the blast wave when wheel 6 drives over and detonates mine 1. Once sensor 2 detects the exploding mine, it sends a sensor signal to the ignition and analysis unit 4 which, in turn, processes the sensor signal and generates activation signals that are sent to each pyrotechnic screw 5, thereby effecting the ignition of the screws and the separation of the wheel 6 and wheel suspension 8 from the wheel suspension mount of the vehicle 10.

In any one of the illustrative embodiments described in accordance with the present invention, sensor 2 can be an optical sensor, a pressure sensor and/or an acceleration sensor. The optical sensors are constructed so as to detect a light flash. The pressure and/or acceleration sensors are constructed and positioned so detection of the impacting sound wave and/or blast wave originating from the exploding mine is performed before the impacting wave reaches the predetermined breaking point 7.1, 8.1 (the breaking point may also be referred to as the "separation point"). Those skilled in the art would realize that the embodiments utilizing pressure and/or acceleration sensors must position these sensors so as to detect the impacting wave from the exploding mine before this wave reaches or passes the separation point, because once the impacting wave has reached the separation point the subsequent separation of the wheel suspension from the vehicle will have no effect on the transmission of the impacting wave through the vehicle.

Figure 3A:
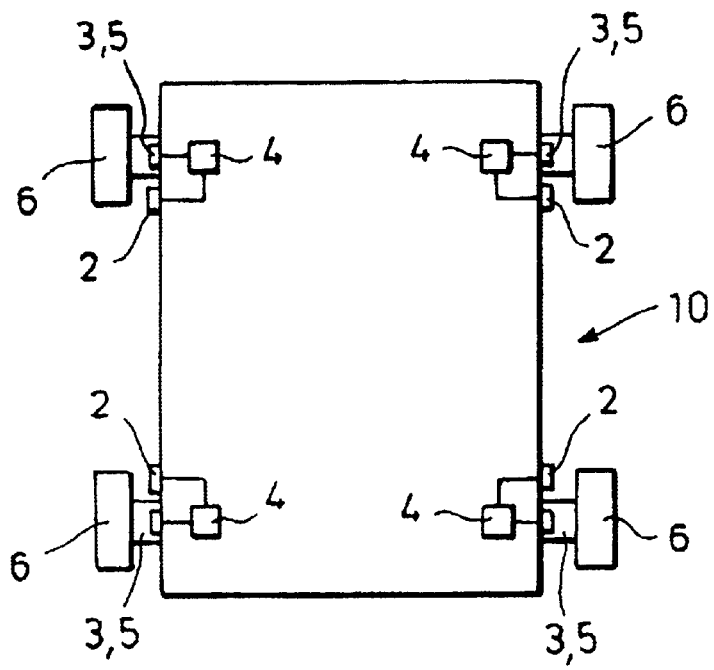
FIG. 3a schematically illustrates a mine protection device in accordance with the present invention wherein an ignition and analysis unit is associated with each wheel.
Figure 3B:
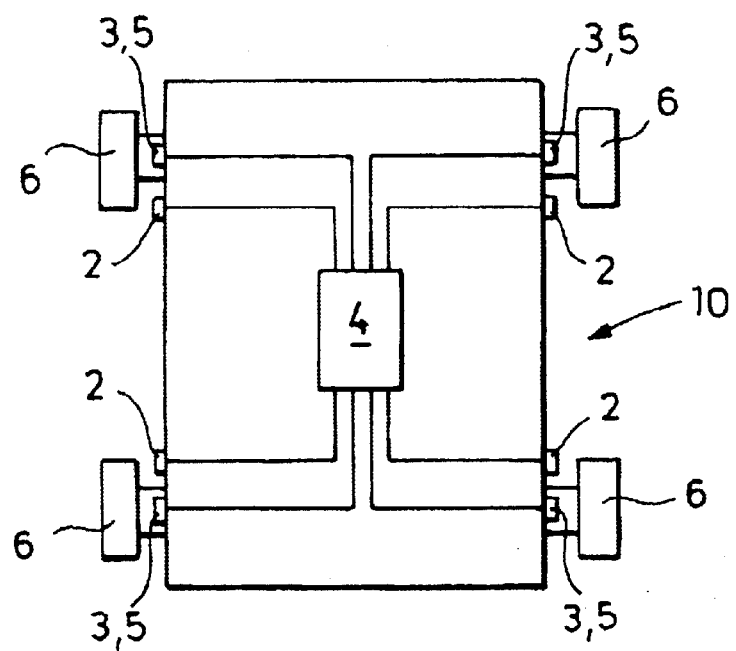
FIG. 3b schematically illustrates a mine protection device in accordance with the present invention wherein there is only one ignition and analysis unit operably connected to receive sensor input from all of the wheels.

Those skilled in the art will realize that the separation elements described above, either the wedge type charge 3 or the pyrotechnic screws 5, provide a means for separating a wheel 6 from the vehicle 10. While the first illustrative embodiment showed a single wedge type charge associated with each wheel, those skilled in the art would realize that each wheel could be provided with one or more wedge type charges without departing from the scope of the present invention. Likewise, those skilled in the art would realize that while the second illustrative embodiment showed two pyrotechnic screws, three or more pyrotechnic screws could be used to attach the wheel suspension to the wheel suspension mount without departing from the scope of the present invention. Furthermore, those skilled in the art would recognize that, in general, the number of sensors 2 and the number of separation means 3, 5 are determined by the number of wheels 6, wherein each wheel 6 has at least one sensor 2, and one separation means 3, 5 as shown in FIG. 3a. However, the number of sensors 2 and separation means 3, 5 may be more or less than the number of wheels in a given case. It is advantageous to provide a number of ignition and analysis units 4 corresponding to the number of wheels 6; however, the present invention can be practiced wherein each sensor is connected to send sensor signal input to a single ignition and analysis unit 4 as shown in FIG. 3b, which would also be connected to each of the separation means for all of the wheels. In this case, the single ignition and analysis unit 4 would be connected to receive signal input from all of the sensors and would be connected to send an activation signal to each separation means. The unit 4 would be programmed to send activation signals selectively to the separation means corresponding to the wheel that detonated the mine and from which the associated sensor or sensors detection signals have originated.

Figure 4:
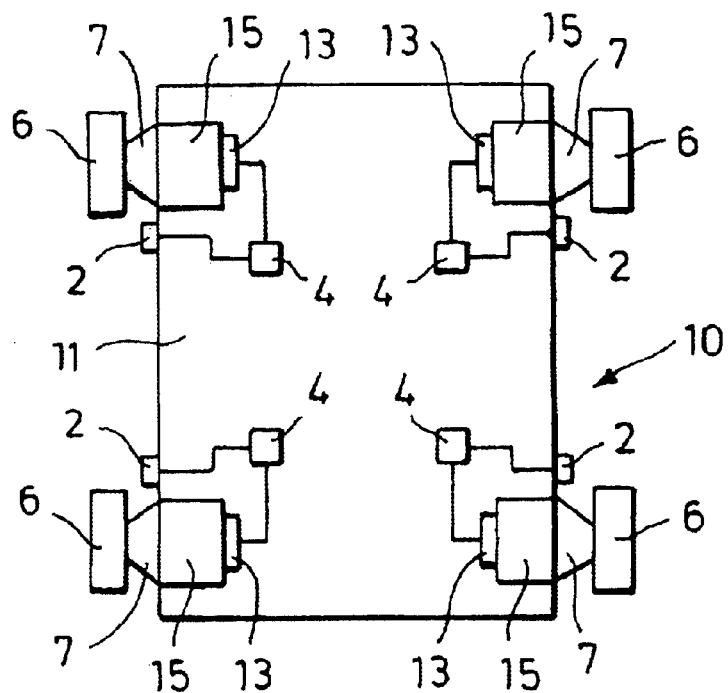
FIG. 4 schematically illustrates another embodiment of the mine protection device of the present invention wherein the wheels of the vehicle are connected to wheel mounting blocks, which are separable from the remainder of the vehicle.

FIG. 4 illustrates yet another modification of the mine protection device in accordance with the present invention. In this embodiment, the wheels 6 are connected or mounted to the remainder of vehicle 10 using wheel building blocks 15. In FIG. 4, the wheel building blocks 15 schematically illustrated represent a component structure, or some severable portion of vehicle 10, constructed so as to be separable from the remaining portion (i.e., the frame 11) of the vehicle. There is a wheel building block 15 associated with each wheel. The wheel suspension 7 can be constructed so as to attach the wheel 6 to the wheel building block 15. In the alternative, the wheel suspension 7 and the wheel building block 15 can be integrally constructed together in an inseparable manner, or the wheel building block 15 can be constructed together with the wheel 6 and the wheel suspension can be disposed between the wheel building block 15 and the frame of the vehicle 10.

In the illustrative embodiment of FIG. 4, at least one sensor 2 is arranged so as to be able to detect an exploding mine detonated by the corresponding, proximate wheel 6. Each sensor 2 is operably connected to send a sensor signal to the corresponding ignition and analysis unit 4. Each ignition and analysis unit 4 operates to receive the sensor signal and to generate an activation signal, which is sent to the corresponding separation means 13 operatively connected to the ignition and analysis unit. The separation means 13 may be an explosive wedge type charge, or pyrotechnic screws, or a combination of one or more explosive charges with one or more pyrotechnic screws, or some other suitable equivalent explosive device.

Thus, the embodiment shown in FIG. 4 operates as follows. When sensor 2 detects an exploding mine, it sends a sensor signal to the ignition and analysis unit 4, which in turn generates an activation signal. The activation signal is sent to separation means 13, which detonates thereby forcing detachment and separation of the component structure (i.e., at least the wheel and the wheel building block, and optionally the wheel suspension) from the remainder of the vehicle 10.

Although the embodiment of FIG. 4 has been drawn to show an ignition and analysis unit 4 associated with each wheel 6, those skilled in the art would realize that these multiple ignition and analysis units 4 could be replaced by a single, central ignition and analysis unit operably connected to receive sensor signals from all of the sensors 2. In this case, the single, central ignition and analysis unit would be operably connected to selectively send an activation signal to the separation means 13 associated with the sensor 2 that detected the light flash or blast wave of the exploding mine.

The apparatus embodiment shown in FIG. 4 operates to perform a method embodiment for protecting a wheeled vehicle from an exploding mine in accordance with the present invention. Specifically, the method embodiment, in accordance with the present invention, is a method for protecting a vehicle having wheels from an exploding mine, wherein the method includes the steps of: (a) providing a vehicle having a plurality of wheels rotatingly connected to a frame, wherein each wheel is separably connected to the frame by a wheel building block, and a mine protection device is associated with each wheel, the mine protection device comprising: (i) a sensor; (ii) an ignition and analysis unit operably connected to receive a sensor signal from the sensor; and (iii) a separation means for separating the wheel building block from the frame, wherein the separation means is operably connected to receive an activation signal from the ignition and analysis unit; (b) when one wheel of the plurality of wheels triggers a mine explosion, detecting a light flash or blast wave from the exploding mine using the sensor associated with the one wheel to generate a sensor signal; (c) using the ignition and analysis unit to receive the sensor signal, and in response thereto, generating an activation signal; and (d) activating the separation means using the activation signal so the separation means separates the wheel building block from the frame.

Figure 5:
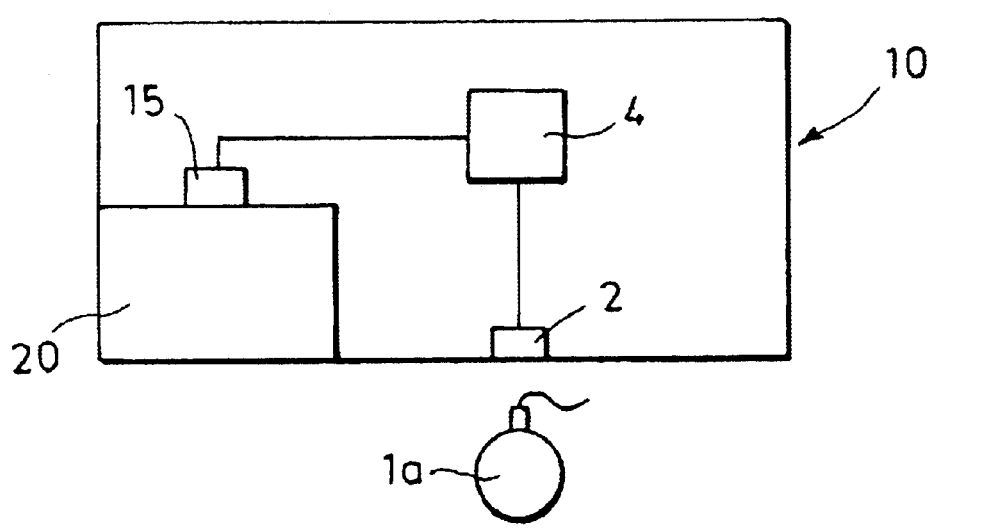
FIG. 5 schematically illustrates another embodiment of the mine protection device of the present invention wherein a portion of the vehicle is separable from the remainder of the vehicle when the sensor detects an exploding device.

FIG. 5 illustrates yet another apparatus embodiment in accordance with the present invention. In this illustrative embodiment, the vehicle 10 includes a structural unit 20, which is some separable portion of the vehicle, associated with an explosion protection device 21. In this case, the explosion protection device includes sensor 2, ignition and analysis unit 4, and separation means 13. Sensor 2 is disposed on the vehicle 10 so as to be able to detect either the light flash or the blast wave of an exploding device 1a. The exploding device 1a could be a land mine, or it could be some other weapon such as a grenade, explosive satchel, bomb or the like. In this embodiment, the sensor 2 is connected to send a sensor signal to the ignition and analysis unit 4, which is connected to send an activation signal to separation means 13. Separation means 13 is disposed so as to be able to separate the structural unit 20 from the remainder of the vehicle 10 when the separation means 13 is activated.

The apparatus embodiment shown in FIG. 5 operates to perform a method embodiment for protecting a vehicle (i.e., either a wheeled vehicle or a non-wheeled vehicle) from an exploding device, such as a mine, a grenade, a bomb or the like, in accordance with the present invention. Specifically, the method embodiment, in accordance with the present invention, is a method for protecting a vehicle from an exploding device, wherein the method includes the steps of: (a) providing a vehicle having a separable structural unit, and an explosion protection device associated with the structural unit, the mine protection device comprising: (i) a sensor; (ii) an ignition and analysis unit operably connected to receive a sensor signal from the sensor; and (iii) a separation means for separating the structural unit from the remainder of the vehicle, wherein the separation means is operably connected to receive an activation signal from the ignition and analysis unit; (b) when the sensor detects the explosion of an exploding device by detecting a light flash or blast wave from the exploding device, generating a sensor signal using the sensor; (c) using the ignition and analysis unit to receive the sensor signal, and in response thereto, generating an activation signal; and (d) activating the separation means using the activation signal so the separation means separates the structural unit from the remainder of the vehicle.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A mine protection device for a wheeled vehicle having a plurality of wheels, wherein each wheel is connected to the vehicle by a wheel building block, the device comprising:
   at least one sensor associated with a wheel, wherein the sensor operates to detect when a mine has been ignited;
   at least one ignition and analysis unit connected to receive sensor signals from the sensor, wherein the at least one ignition and analysis unit processes individual sensor signals; and
   a separation means, associated with the wheel, for separating the associated wheel from the vehicle when the mine has been ignited by separating the wheel building block connected to the associated wheel from the vehicle.

2. A mine protection device according to claim 1, wherein the wheel building block is a wheel suspension.

3. A mine protection device according to claim 1, wherein the separation means comprises a wedge charge.

4. A mine protection device according to claim 1, wherein the separation means comprises at least one pyrotechnic separation screw.

5. A mine protection device according to claim 1, wherein the sensor is selected from the group consisting of an optical sensor, a pressure sensor and an acceleration sensor.

6. A mine protection device according to claim 2, wherein the sensor is selected from the group consisting of an optical sensor, a pressure sensor and an acceleration sensor.

7. A mine protection device according to claim 3, wherein the sensor is selected from the group consisting of an optical sensor, a pressure sensor and an acceleration sensor.

8. A mine protection device according to claim 4, wherein the sensor is selected from the group consisting of an optical sensor, a pressure sensor and an acceleration sensor.

9. A vehicle comprising:
   (a) a vehicle frame;
   (b) a plurality of wheels rotatingly connected to the vehicle frame, wherein each wheel is connected to the frame by a wheel suspension; and
   (c) a mine protection device associated with the vehicle frame, the device comprising:
      (i) a sensor associated with at least one wheel, wherein the sensor is arranged to detect a proximate exploding mine;
      (ii) an ignition and analysis unit operably connected to receive signal input from the sensor, wherein the ignition and analysis unit processes sensor signal input and generates an activation signal output in response thereto, and
      (iii) a separation means associated with the at least one wheel, wherein the separation means is connected to receive activation signal input from the ignition and analysis unit.

10. A vehicle as recited in claim 9, wherein when the at least one wheel of the plurality of wheels drives over and detonates a mine, the sensor associated with the one wheel detects the exploding mine and generates sensor signal input, the ignition and analysis unit receives and processes the sensor signal input then sends an activation signal to the separation means associated with the one wheel, and in response to receiving the activation signal, the separation means separates the one wheel from the vehicle by separating the wheel suspension connected to the one wheel from the vehicle frame.

11. A vehicle as recited in claim 10, wherein the separation means comprises a wedge charge.

12. A vehicle as recited in claim 10, wherein the separation means comprises at least one pyrotechnic separation screw.

13. A vehicle as recited in claim 9, wherein the sensor is selected from the group consisting of an optical sensor, a pressure sensor and an acceleration sensor.

14. A vehicle as recited in claim 11, wherein each sensor is selected from the group consisting of an optical sensor, a pressure sensor and an acceleration sensor.

15. A vehicle as recited in claim 12, wherein each sensor is selected from the group consisting of an optical sensor, a pressure sensor and an acceleration sensor.

16. A vehicle comprising: (a) a structural unit separable from a remainder of the vehicle;
   (b) an explosion protection device associated with the structural unit, the device comprising:
      (i) a sensor disposed on the vehicle so as to detect a light flash or a blast wave of an exploding device;
      (ii) a ignition and analysis unit connected to receive a sensor signal from the sensor; and
      (iii) separation means connected to receive an activation signal from the ignition and analysis unit.

17. A vehicle as recited in claim 16, wherein the sensor operates to send the sensor signal to the ignition and analysis unit when the sensor detects the light flash or the blast wave of the exploding device, the ignition and analysis unit operates to send the activation signal to the separation means upon receiving the sensor signal, and the separation means operates to separate the structural unit from the remainder of the vehicle in response to receiving the activation signal.

18. A method for protecting a vehicle from an exploding device, comprising the steps of:
   (a) providing a vehicle having a separable structural unit, and an explosion protection device associated with the structural unit, the mine protection device comprising:
      (i) a sensor; (ii) an ignition and analysis unit operably connected to receive a sensor signal from the sensor; and (iii) a separation means for separating the structural unit from the remainder of the vehicle, wherein the separation means is operably connected to receive an activation signal from the ignition and analysis unit;
   (b) when the sensor detects a light flash or blast wave from the exploding device, generating a sensor signal using the sensor;
   (c) using the ignition and analysis unit to receive the sensor signal, and in response thereto, generating an activation signal; and
   (d) activating the separation means using the activation signal so the separation means separates the structural unit from the remainder of the vehicle.

* * * * *